US009156341B2

(12) United States Patent
Matsumura et al.

(10) Patent No.: US 9,156,341 B2
(45) Date of Patent: Oct. 13, 2015

(54) ELECTRIC WORK VEHICLE AND BATTERY HOLDING STRUCTURE THEREOF

(75) Inventors: Yukinori Matsumura, Isehara (JP); Yoshiyuki Takano, Oyama (JP); Hikaru Tajima, Oyama (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 13/982,566

(22) PCT Filed: Mar. 16, 2012

(86) PCT No.: PCT/JP2012/056817
§ 371 (c)(1),
(2), (4) Date: Jul. 30, 2013

(87) PCT Pub. No.: WO2012/128195
PCT Pub. Date: Sep. 27, 2012

(65) Prior Publication Data
US 2013/0313030 A1    Nov. 28, 2013

(30) Foreign Application Priority Data

Mar. 24, 2011    (JP) .................................. 2011-066120

(51) Int. Cl.
*B60K 1/04*    (2006.01)
*H01M 2/10*    (2006.01)
(Continued)

(52) U.S. Cl.
CPC . *B60K 1/04* (2013.01); *B60L 1/003* (2013.01); *B60L 11/1803* (2013.01);
(Continued)

(58) Field of Classification Search
CPC .................. B60L 11/1877; B60K 1/00; B60K 2001/0416; B60K 2001/0405; B60K 1/04; B60K 2001/0477; B66F 9/07531; H01M 2/1077; H01M 2/1083

USPC .............. 180/68.1–68.5, 69.5, 65.1; 429/151, 429/163–187
See application file for complete search history.

(56) References Cited

U.S. PATENT DOCUMENTS 5,004,081 A * 4/1991 Custer .......................... 180/68.5
5,501,289 A * 3/1996 Nishikawa et al. .......... 180/68.5
(Continued)

FOREIGN PATENT DOCUMENTS

| JP | H11140906 | * | 5/1999 |
| JP | 2008-44408 A | | 2/2008 |
| JP | 2010-121328 A | | 6/2010 |
| WO | 2011/158686 A1 | | 12/2011 |

OTHER PUBLICATIONS

International Search Report for PCT/JP2012/056817, issued on Jun. 19, 2012.

*Primary Examiner* — Brodie Follman
*Assistant Examiner* — Emma K Frick
(74) *Attorney, Agent, or Firm* — Global IP Counselors, LLP

(57) ABSTRACT

A battery holding structure for an electric work vehicle equipped with a battery-driven electric motor includes a plurality of battery cases, a base frame and a plurality of pillars. The battery cases respectively have a bottom wall and front, rear, right and left sidewalls. The battery cases respectively accommodate a plurality of batteries aligned in a lateral direction. The battery cases are stacked in a vertical direction. The battery cases are installed in a rear part of the base frame. The rear sidewalls of respective ones of the battery cases are fixed to the pillars. The pillars are respectively fixed at bottom end portions thereof to a rear end portion of the base frame and extending upwardly.

9 Claims, 8 Drawing Sheets

(51) Int. Cl.
*B60L 11/18* (2006.01)
*E02F 3/32* (2006.01)
*E02F 9/08* (2006.01)
*E02F 9/20* (2006.01)
*B60L 1/00* (2006.01)

(52) U.S. Cl.
CPC ........ *B60L 11/1816* (2013.01); *B60L 11/1822* (2013.01); *B60L 11/1855* (2013.01); *B60L 11/1864* (2013.01); *B60L 11/1877* (2013.01); *B60L 11/1879* (2013.01); *E02F 3/325* (2013.01); *E02F 9/0866* (2013.01); *E02F 9/207* (2013.01); *H01M 2/1083* (2013.01); *B60K 2001/0416* (2013.01); *B60L 2200/40* (2013.01); *B60Y 2200/412* (2013.01); *Y02T 10/7005* (2013.01); *Y02T 10/7061* (2013.01); *Y02T 10/7072* (2013.01); *Y02T 90/124* (2013.01); *Y02T 90/14* (2013.01)

(56) References Cited

U.S. PATENT DOCUMENTS

| | | | | |
|---|---|---|---|---|
| 5,639,571 | A * | 6/1997 | Waters et al. | 429/71 |
| 5,948,298 | A * | 9/1999 | Ijaz | 219/209 |
| 6,189,636 | B1 * | 2/2001 | Kikukawa | 180/68.5 |
| 6,345,677 | B1 * | 2/2002 | Eckersley et al. | 180/68.5 |
| 6,547,020 | B2 * | 4/2003 | Maus et al. | 180/68.5 |
| 6,732,825 | B2 * | 5/2004 | Takeda | 180/68.5 |
| 7,204,047 | B2 * | 4/2007 | Murakami | 37/347 |
| 7,374,004 | B2 * | 5/2008 | Kraimer et al. | 180/68.5 |
| 8,100,210 | B2 * | 1/2012 | Takeuchi et al. | 180/68.5 |
| 8,465,866 | B2 * | 6/2013 | Kim | 429/149 |
| 8,540,042 | B2 * | 9/2013 | Atarashi et al. | 180/68.1 |
| 8,631,890 | B2 * | 1/2014 | Noguchi et al. | 180/68.1 |
| 8,669,000 | B2 * | 3/2014 | Yoon | 429/99 |
| 8,727,055 | B2 * | 5/2014 | Matsumura et al. | 180/68.5 |
| 8,919,465 | B2 * | 12/2014 | Takeo | 180/65.21 |
| 2009/0314557 | A1 * | 12/2009 | Takeuchi et al. | 180/65.1 |
| 2013/0078071 | A1 * | 3/2013 | Noguchi et al. | 414/719 |

* cited by examiner

ELECTRIC WORK VEHICLE AND BATTERY HOLDING STRUCTURE THEREOF

CROSS-REFERENCE TO RELATED APPLICATIONS

This application claims priority to Japanese Patent Application No. 2011-066120, filed on Mar. 24, 2011, the disclosure of which is hereby incorporated herein by reference in its entirety.

BACKGROUND

1. Field of Invention

The present invention relates to a battery holding structure, particularly to a battery holding structure for an electric work vehicle equipped with a battery-driven electric motor, and relates to a work vehicle provided with the same.

2. Background Information

In recent years, electric work vehicles have been proposed in the field of work vehicles such as excavators with consideration for environmental problems and so forth. For example, an electric excavator described in Japan Laid-open Patent Application Publication No. JP-A-2010-121328 employs an electric motor to be driven by batteries instead of an engine installed in a well-known hydraulic excavator. Further, a hydraulic pump is configured to be driven by the electric motor and supply hydraulic pressure to a hydraulic cylinder for driving a working machine through a control valve.

At present, a large number of batteries are required for driving an electric motor in such an electric excavator as described above. In view of this, such a battery holding structure has been proposed as described in Japan Laid-open Patent Application Publication No. JP-A-2008-44408. The battery holding structure described in Japan Laid-open Patent Application Publication No. JP-A-2008-44408 includes a plurality of chassis, a rack and a plurality of fixation means. Here, each of the plural chassis accommodates a plurality of batteries, and further, the plural chassis are stacked in the rack. Then, the plural chassis are designed to be fixed to the rack by means of the plural fixation means. Moreover, in Japan Laid-open Patent Application Publication No. JP-A-2008-44408, a battery accommodation region is disposed in the rear part of a revolving unit, and the plural batteries are accommodated with use of the aforementioned battery holding structure in the battery accommodation region. Furthermore, the plural batteries and a plurality of inverters are disposed instead of a counterweight installed in a well-known hydraulic excavator.

SUMMARY

As described in Japan Laid-open Patent Application Publication No. JP-A-2008-44408, in an electric excavator, a plurality of batteries and a plurality of inverters are generally disposed instead of the counterweight of the well-known excavator. In this case, chances are that the total weight of the batteries exceeds the weight of the counterweight, because a large number of batteries are required at present as described above. Now, an excavator is required to set the center of gravity of the vehicle body in the vicinity of the revolving center thereof. Therefore, in consideration of the weight balance, the batteries are required to keep the installation position thereof in the rear end portion of the vehicle and be disposed forwards as much as possible. Especially, in a small excavator equipped with a revolving unit inhibited from being protruded rearwards, the batteries are required to be disposed forwards as much as possible also in order to reduce the revolving radius of the rear end portion of the revolving unit.

The electric excavator described in Japan Laid-open Patent Application Publication No. JP-A-2008-44408 is herein a relatively large excavator, and wherein, the electric motor and the hydraulic pump can be disposed on a lateral side of the vehicle. A large space can be thereby reliably produced from the revolving center of the revolving unit to the rear end portion of the revolving unit, and thus, a sufficient battery accommodation space exists.

However, it is difficult for a small excavator of a small revolving type with a reduced revolving radius to reliably produce a large space on the revolving unit (revolving frame). Further, when the battery accommodation region is disposed in the rear end portion, it is required to dispose the electric motor, the hydraulic pump, a hydraulic auxiliary device and so forth between the battery accommodation region and the revolving center.

It is difficult for such a small excavator as described above to employ a battery holding structure to be used for such a large excavator as described in Japan Laid-open Patent Application Publication No. JP-A-2008-44408. Specifically, in the battery holding structure of Japan Laid-open Patent Application Publication No. JP-A-2008-44408, side plates occupy all the four corners of the rack. To avoid interference of the side plates with members disposed ahead, it is not easy to dispose the batteries forwards. Therefore, when the batteries are disposed in the rear part of the revolving frame with use of the battery holding structure described in Japan Laid-open Patent Application Publication No. JP-A-2008-44408, the battery accommodation region is protruded rearwards and this makes it difficult to suppress the rearward revolving radius to a small radius.

It is an object of the present invention to provide a battery holding structure for an electric work vehicle equipped with a battery-driven electric motor, whereby a vehicle frame is inhibited from being protruded rearwards and reduction in size of the vehicle is not hindered even when batteries are disposed in the rear end portion of the vehicle frame.

Solution to Problems

A battery holding structure for an electric work vehicle according to a first aspect of the present invention is provided for a work vehicle equipped with a battery-driven electric motor, and includes a plurality of battery cases, a base frame and a plurality of pillars. The battery cases respectively have a bottom wall and front, rear, right and left sidewalls, respectively accommodate a plurality of batteries aligned in a lateral direction and are stacked in a vertical direction. The base frame is the one that the plurality of battery cases are installed in a rear part thereof. The plurality of pillars are the ones to which the rear sidewalls of the respective battery cases are fixed, and are respectively fixed at bottom end portions thereof to a rear end portion of the base frame while being disposed in an upwardly extended state.

In the holding structure, plural batteries are accommodated in a single battery case, and further, such plural battery cases are stacked in the vertical direction. Then, the rear sidewalls of the plural battery cases are respectively fixed to the plural pillars fixed to the rear end portion of the base frame.

Here, the plural batteries can be disposed in a small space. Further, the plural battery cases are respectively fixed to the plural pillars fixed to the rear end portion of the base frame. Therefore, the plural battery cases can be fixed to the base frame through the pillars. Furthermore, the battery cases are herein held by the pillars fixed to the rear end portion of the base frame. Therefore, it is not required to provide a rack in a well-known battery holding structure.

A battery holding structure for an electric work vehicle according to a second aspect of the present invention relates to the battery holding structure according to the first aspect, and further includes a positioning structure provided for the right and left sidewalls of the plurality of battery cases, the positioning structure restricting every adjacent two of the battery cases in a stacked direction from moving relatively to each other in a back-and-forth direction.

The plural battery cases are fixed to the base frame by the aforementioned plural pillars. In the present invention, additionally to the above, the positioning structure is provided for the right and left sidewalls of the batteries. The respective battery cases are restricted from moving back and forth by the positioning structure. Therefore, the plural battery cases can be more stably held.

A battery holding structure for an electric work vehicle according to a third aspect of the present invention relates to the battery holding structure according to the second aspect, and wherein the positioning structure is formed by convex and concave portions that are provided for the right and left sidewalls of the respective plurality of battery cases and restrict the every adjacent two of the battery cases in an up-and-down direction from moving relatively to each other in the back-and-forth direction by causing the every adjacent two of the battery cases in the up-and-down direction to be fitted to each other.

Here, the positioning structure is formed by the convex and concave portions formed on the right and left sidewalls of the battery cases. Therefore, the battery cases can be restricted from moving in the back-and-forth direction with a simple structure without necessity of a special member.

A battery holding structure for an electric work vehicle according to a fourth aspect of the present invention relates to the battery holding structure according to any of the first to third aspects, and further includes a lateral support structure for supporting the right and left sidewalls of the plurality of battery cases with respect to a base frame.

Here, the right and left sidewalls of the respective battery cases are supported by the base frame. Therefore, the battery cases can be more stably held.

A battery holding structure for an electric work vehicle according to a fifth aspect of the present invention relates to the battery holding structure according to any of the first to fourth aspects, and wherein the front sidewalls of the plurality of battery cases are not supported by the base frame.

Here, no member for holding the battery cases exists ahead the battery cases. Therefore, the battery cases can be disposed forwards. Further, members for fixation such as pillars are not required to be mounted to the front parts of the battery cases. Therefore, in comparison with a well-known holding structure, the battery cases can be disposed further forwards in the vehicle. Consequently, the vehicle can be inhibited from being bulged, particularly, to the rearward in the electrification of a work vehicle.

An electric work vehicle according to a first aspect of the present includes: a vehicle body frame; a travelling mechanism supported by the vehicle body frame; a working machine unit including a working machine and a working machine drive part for driving the working machine; an electric motor for driving the travelling mechanism and the working machine unit; a power source unit that includes a plurality of batteries and is configured to supply electric power to the electric motor; and the battery holding structure recited in any of the first to fifth aspects.

An electric work vehicle according to a second aspect of the present invention relates to the electric work vehicle according to the first aspect, and wherein the base frame is revolvable about a revolving shaft extending in an up-and-down direction. Further, the electric motor is disposed between the revolving shaft and the battery holding structure disposed in the rear part of the base frame.

It is difficult for the work vehicle having such structure to reliably produce a large space ahead of the power source unit having the battery holding structure. In view of this, through the employment of the aforementioned battery support structure, the batteries can be disposed further forwards.

Advantageous Effects of Invention

In the present invention as described above, even when the batteries are disposed in the rear end portion of the frame, the batteries and the frame can be inhibited from being bulged rearwards, and thereby, increase in size of the vehicle can be avoided.

DESCRIPTION OF THE EMBODIMENTS

Figure 1:
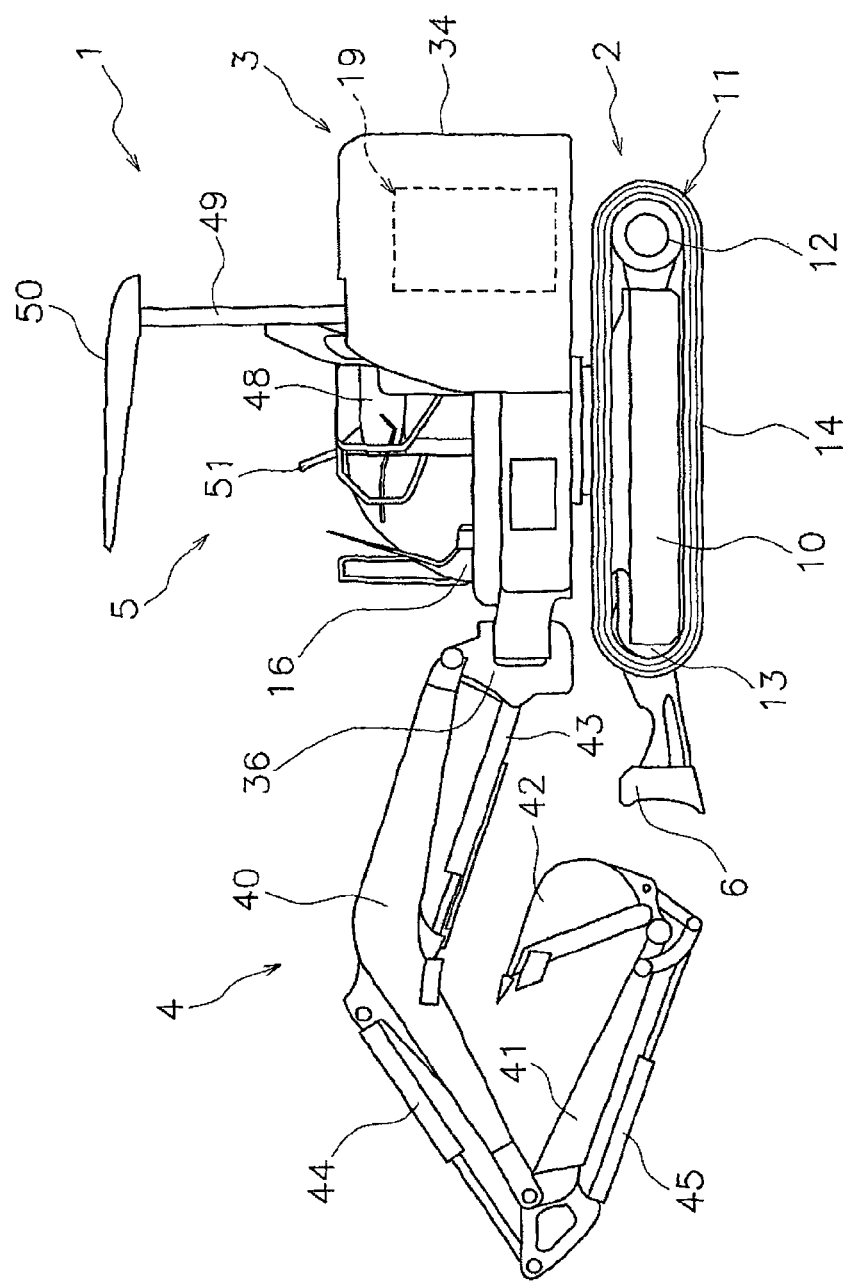
FIG. 1 is a side view of an electric excavator employing a battery support mechanism according to an exemplary embodiment of the present invention.

FIG. 1 illustrates an electric excavator provided with a battery holding structure according to an exemplary embodiment of the present invention. The electric excavator 1 is an exemplary electric work vehicle to which the present invention is applied, and is equipped with a battery-driven electric motor instead of an engine installed in a well-known excavator. It should be noted that in the following explanation, the terms "front" and "rear" respectively refer to a forward direction and a rearward direction in the back-and-forth direction of the vehicle. Further, the terms "left" and "right" respectively refer to a leftward direction and a rightward direction in the vehicle width direction with reference to the forward direction of the vehicle.

Overall Structure

As illustrated in FIG. 1, the electric excavator 1 mainly includes a lower travelling unit 2, an upper revolving unit 3, an excavator mechanism 4 and a canopy-type cab 5. Further, a blade 6 is supported by the front part of the lower travelling unit 2, while being pivotable in the up-and-down direction.

The lower travelling unit 2 includes a track frame 10 and a pair of right and left travelling mechanisms 11. Each of the right and left travelling mechanisms 11 includes: a drive wheel 12 supported by the rear end portion of the track frame 10; a driven wheel 13 supported by the front end portion of the track frame 10; and a crawler belt 14 stretched over the drive wheel 12 and the driven wheel 13. The drive wheel 12 is configured to be driven by a travelling motor.

The upper revolving unit 3 is supported by the upper part of the lower travelling unit 2, while being revolvable with respect to the lower travelling unit 2. Specifically, a revolving bearing is mounted to the lower travelling unit 2, whereas a pinion gear meshed with the revolving bearing is mounted to the upper revolving unit 3. Further, through the driving of the pinion gear by a revolving motor (not illustrated in the figures), the upper revolving unit 3 is revolvable on the lower travelling unit 2 in an arbitrary direction.

Figure 2:
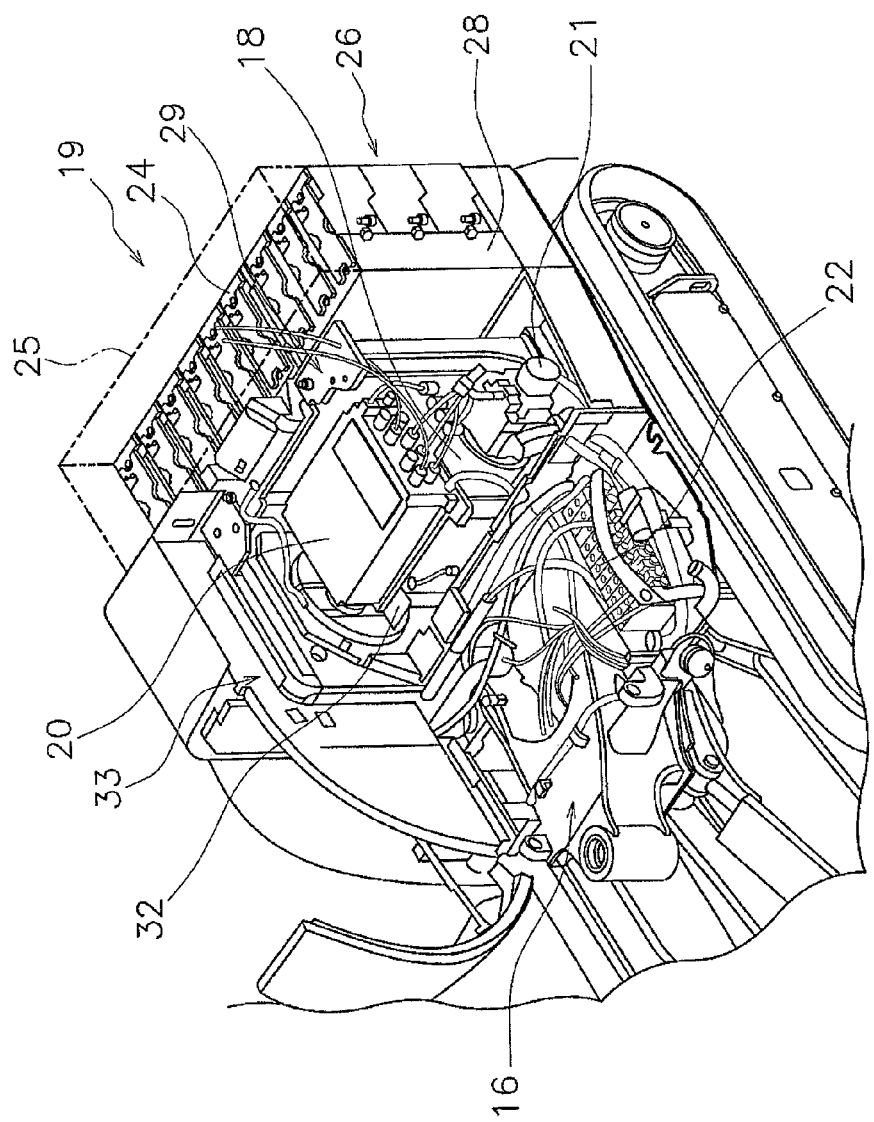
FIG. 2 is an external view of a structure of an upper revolving unit of the electric excavator.

FIG. 2 illustrates an arrangement of the respective devices in the upper revolving unit 3. A condition is herein illustrated where a vehicle body cover and the cab are removed. The upper revolving unit 3 includes a revolving frame (base frame) 16 disposed on the bottom part thereof. The revolving frame 16 is supported in a revolvable state by the roughly center part of the track frame 10. As described above, the revolving frame 16 is driven and revolved by the revolving motor. An electric motor 18, a power source unit 19, an inverter device 20, a hydraulic pump 21, a control valve 22 and so forth are disposed on the revolving frame 16. It should be noted that the detailed structure of the revolving frame 16 will be described below.

The power source unit 19 is configured to supply electric power to the electric motor 18, and is disposed on the rear end portion of the revolving frame 16. The power source unit 19 includes a plurality of sealed batteries 24 and a contactor box 25 (depicted with a dashed two-dotted line in FIG. 2). The plural batteries 24 are held by a battery holding structure 26. The battery holding structure 26 will be described below in detail. It should be noted that a canopy mount 29 is disposed forwards of the power source unit 19 through a heat shield plate 28 interposed therebetween.

The electric motor 18 and the hydraulic pump 21 are disposed further forwards of the canopy mount 29. The electric motor 18 is installed in a horizontal position such that the rotary shaft thereof is extended in the right-and-left direction. The hydraulic pump 21 is coupled to the left side of the electric motor 18. Further, the hydraulic pump 21 is connected to the control valve 22 through a hydraulic pipe.

The inverter device 20 is supported by a pair of support members 32 forwardly extended from the canopy mount 29, while being disposed over the electric motor 18. The inverter device 20 includes: an inverter circuit for converting DC power into AC power with an arbitrary frequency; a microcomputer for controlling the inverter circuit; and so forth. A power input of the inverter device 20 is connected to the contactor box 25, whereas a power output is connected to the electric motor 18.

The control valve 22 is disposed further forwards of the hydraulic pump 21. Further, the control valve 22 is connected between the hydraulic pump 21 and the following components: hydraulic cylinders for driving the respective working machines; the revolving motor; and the travelling motor.

It should be noted that other than the aforementioned devices, a refrigeration unit 33 including a radiator, the vehicle body cover 34 (see FIG. 1) for covering components on the revolving frame 16 other than the cab 5, and so forth are disposed on the revolving frame 16. However, the detailed explanation thereof will not be herein made.

As illustrated in FIG. 1, the excavator mechanism 4 includes: a swing post 36 attached to the revolving frame 16; a boom 40, an arm 41 and a bucket 42 that are attached to the revolving frame 16 through the swing post 36; and a plurality of cylinders 43, 44 and 45 for driving the boom and so forth.

The swing post 36 is supported by the tip end of the revolving frame 16 through a pin, while being swingable about a vertical axis. The boom 40 is coupled at the base end thereof to the swing post 36, while being pivotable about a horizontal axis. Further, the hydraulic cylinder 43 for the boom is connected between a roughly middle part of the boom 40 and the swing post 36. The arm 41 is coupled at the base end thereof to the tip end of the boom 40, while being pivotable about a horizontal axis. The hydraulic cylinder 44 for the arm is connected between a roughly middle part of the boom 40 and the base end of the arm 41. The bucket 42 is coupled to the tip end of the arm 41 while being pivotable about the horizontal axis. The hydraulic cylinder 45 for the bucket is connected between the base end of the arm 41 and the bucket 42.

As illustrated in FIG. 1, the cab 5 includes: a seat 48 on which an operator is seated; and console boxes (not illustrated in the figures) installed on the right and left of the seat 48. Further, right and left pillars 49 are disposed on the right and left rear of the seat 48, while the bottom end portions thereof are supported by the canopy mount 29. A canopy 50 is supported by the right and left pillars 49. Furthermore, an operating lever 51 and so forth are mounted forwards of the seat 48 in order to perform operations of the travelling mechanisms 11, the excavator mechanism 4 and so forth.

System Block

Figure 3:
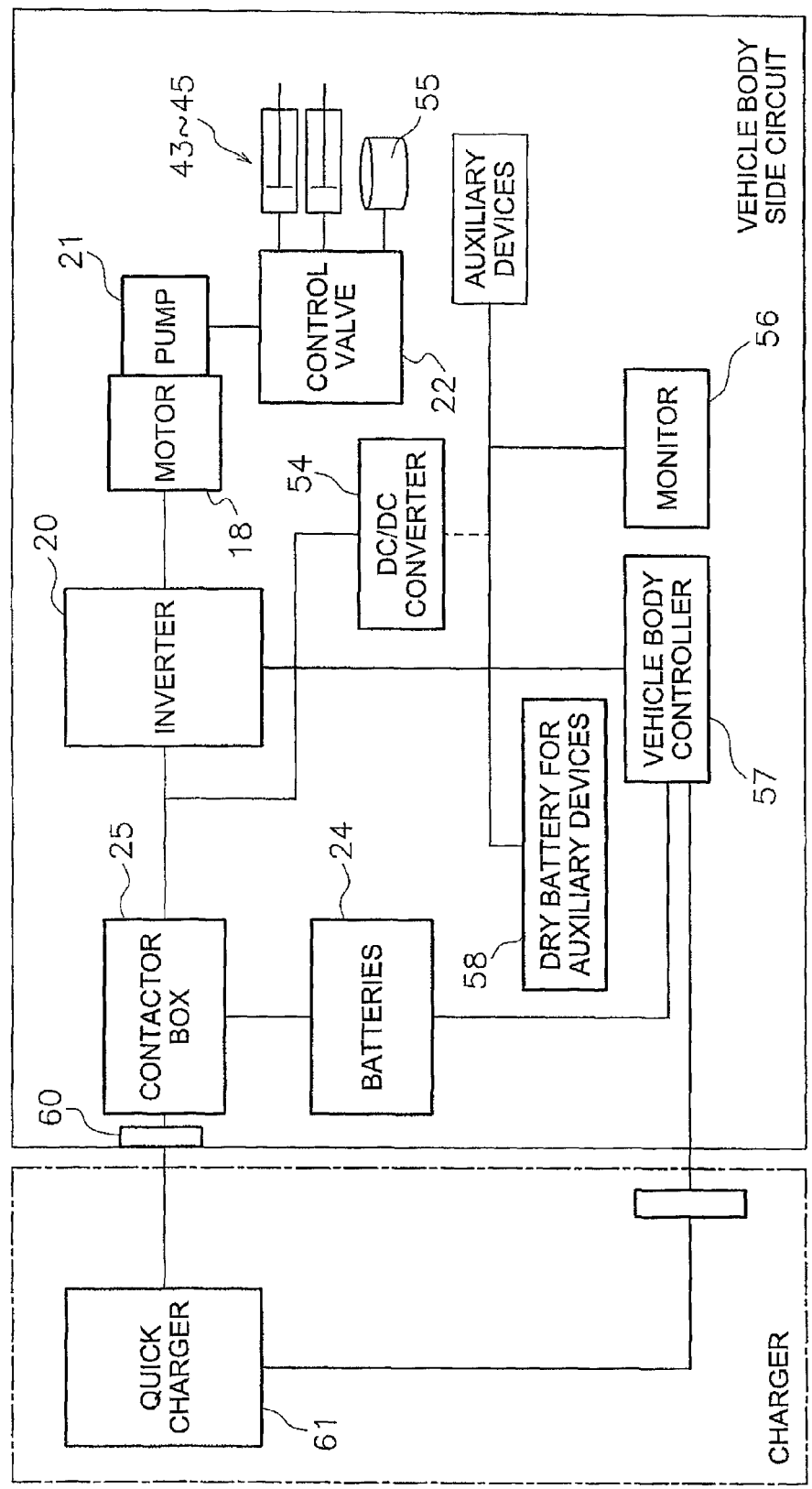
FIG. 3 is a system block diagram of the electric excavator.

As described above, in the electric excavator 1 of the present exemplary embodiment, the electric motor 18 is driven by the batteries 24, and in turn, the electric motor 18 drives the hydraulic pump 21 for actuating the excavator mechanism 4 and the travelling mechanisms 11. FIG. 3 represents the system blocks of the present electric excavator 1. It should be noted that FIG. 3 represents only the main components.

The batteries 24 are connected to the contactor box 25, and the outputs of the contactor box 25 are connected to the inverter device 20 and a DC/DC converter 54. An electromagnetic contact (contactor), a fuse, a sensor for detecting voltage and current, and so forth are installed in the contactor box 25. The inverter device 20 is connected to the electric motor 18, and the output of the electric motor 18 is connected to the hydraulic pump 21. The hydraulic pressure from the hydraulic pump 21 is supplied through the control valve 22 to the respective hydraulic cylinders 43 to 45 of the excavator mechanism, the revolving and travelling motors 55. On the other hand, the direct voltage, appropriately converted by the DC/DC converter 54, is supplied as the drive voltage for a monitor 56 installed in the cab 5 and a vehicle body controller 57. The vehicle body controller 57 is connected to the inverter device 20, the batteries 24 and a quick charger 61. It should be noted that other than the batteries 24 for driving the electric motor, the excavator 1 is additionally equipped with a dry battery 58 for auxiliary devices that is installed in a well-known excavator.

Further, the present electric excavator 1 has a charge connector 60, and is capable of charging the batteries 24 through the charge connector 60 by means of the external quick charger 61. The quick charger 61 is connected to the contactor box 25 through the charge connector 60. The vehicle body controller 57 is configured to monitor the charged voltage in the batteries 24 and control the actuation of the quick charger 61 so as not to overcharge the batteries 24.

Revolving Frame

Figure 4:
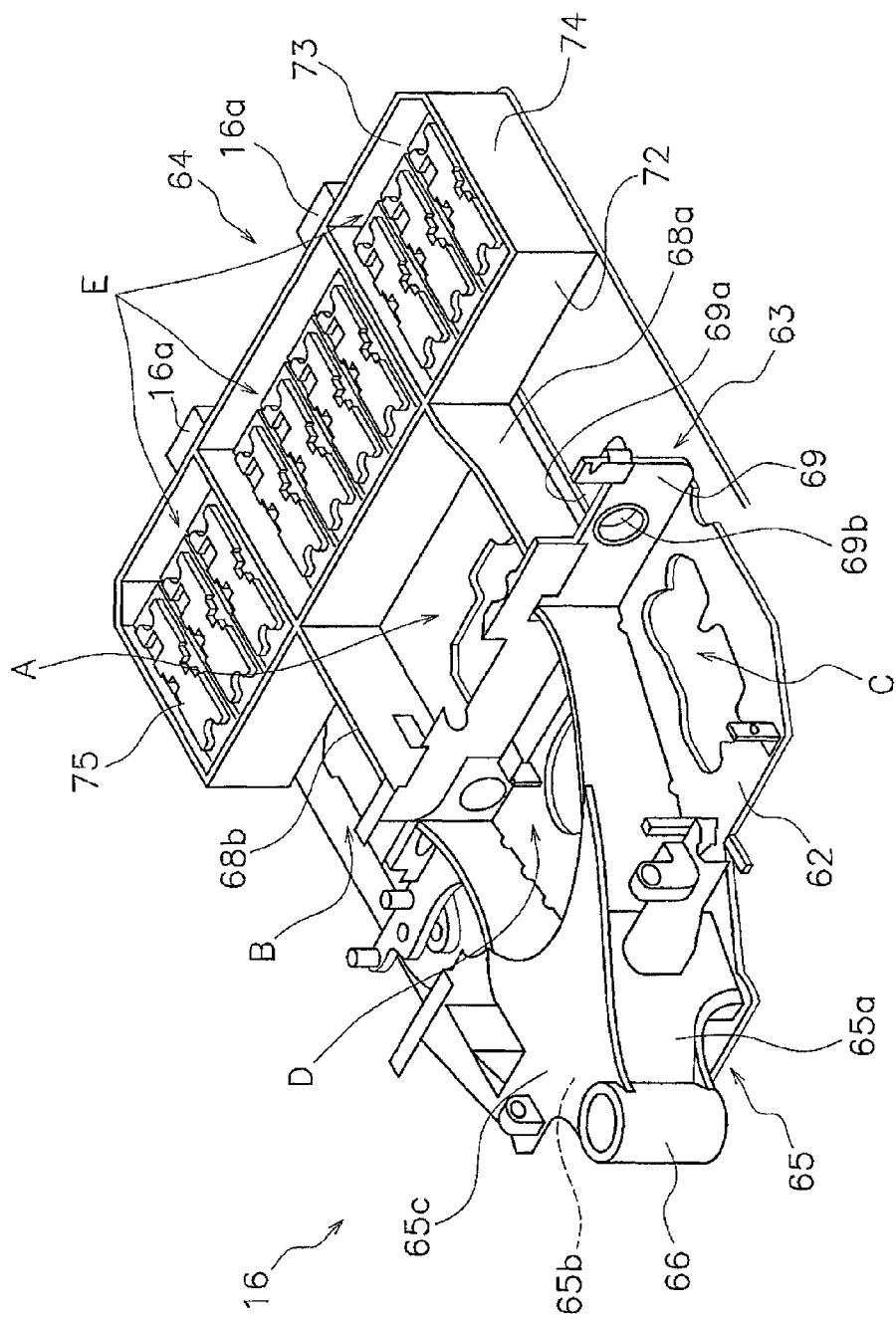
FIG. 4 is an external perspective view of a revolving frame and a first battery group.

As illustrated in FIG. 4, the revolving frame 16 includes: a base plate 62 formed in a shape extended in the back-andforth direction; and device installation compartment plates 63 and a battery accommodation compartment plate 64 that are respectively fixed onto the base plate 62.

A bracket 66 for supporting the working machine is fixed to the front end portion of the base plate 62 through a plurality of support plates 65. The plural support plates 65 include: a left support plate 65a and a right support plate 65b that are respectively fixed at the bottom ends thereof to the base plate 62; and an upper support plate 65c that is fixed to the upper surfaces of the left and right support plates 65a and 65b and has a roughly triangular shape in a plan view. The bracket 66 is formed in a cylindrical shape having a through hole 66a in the up-and-down direction and supports the swing post 36 through the pin (not illustrated in the figures) inserted into the through hole 66a. It should be noted that the left and right support plates 65a and 65b and the upper support plate 65c are made of plates with thicknesses greater than the thickness of the base plate 62.

The device installation compartment plates 63 include: left and right vertical partition plates 68a and 68b that are disposed at an interval in the right-and-left direction; and a single horizontal partition plate 69. The left vertical partition plate 68a is disposed between the left support plate 65a and the battery accommodation compartment plate 64. On the other hand, the right vertical partition plate 68b is disposed between the right support plate 65b and the battery accommodation compartment plate 64. Further, the left and right vertical partition plates 68a and 68b are made of plates with thicknesses greater than the thickness of the base plate 62. The horizontal partition plate 69 is disposed roughly on the center parts of the left and right vertical partition plates 68a and 68b in the back-and-forth direction, while being disposed over the range from the left end portion to the right end portion of the revolving frame 16. It should be noted that the horizontal partition plate 69 has a cutout 69a and a through hole 69b through which pipes and so forth for connecting the respective devices pass.

Regions for installing the respective devices are formed on the revolving frame 16 by the respective plates as described above. Specifically, the electric motor 18 and the hydraulic pump 21 are disposed in a region A, whereas the refrigeration unit 33 including the radiator and so forth is disposed in a region B. Further, hydraulic devices including the control valve 22 and so forth are disposed in a region C, whereas a mechanism for revolving the revolving frame 16, including the pinion gear and so forth, is disposed in a region D.

The battery accommodation compartment plate 64 is disposed on the rear end portion of the revolving frame 16 and form a region E for accommodating a plurality of batteries in the inside thereof. The battery accommodation compartment plate 64 is formed by a pair of a front plate 72 and a rear plate 73 and a pair of a left side plate 74 and a right side plate 75 in order to form the battery accommodation region E opened upwards. Further, the left and right vertical partition plates 68a and 68b are extended into the battery accommodation region E. The left and right vertical partition plates 68a and 68b, extended into the battery accommodation region E, connect the front plate 72 and the rear plate 73.

The rear plate 73 is disposed along the rear edge of the revolving frame 16, whereas the front plate 72 is disposed forwards of the rear plate 73 at an interval. Further, the front plate 72 and the rear plate 73 are disposed on the rear end portion of the revolving frame 16 while being extended from the left end portion to the right end portion. The left side plate 74 and the right side plate 75 are respectively disposed along the left and right edges of the revolving frame 16.

Here, the plural plates 63 and 64 for forming the respective compartments function as ribs for reinforcing the strength of the revolving frame 16. Therefore, the revolving frame 16 can be increased in its strength without being provided with a special member and so forth. Especially, the left and right vertical partition plates 68a and 68b are continuously formed between the left and right support plates 65a and 65b and the battery accommodation compartment plate 64. Therefore, the strength of the revolving frame 16 can be further increased. Further, the strength of the rear part of the revolving frame 16 is further reinforced by the two partition plates 68a and 68b in the battery accommodation region E.

Battery Holding Mechanism

Figure 5:
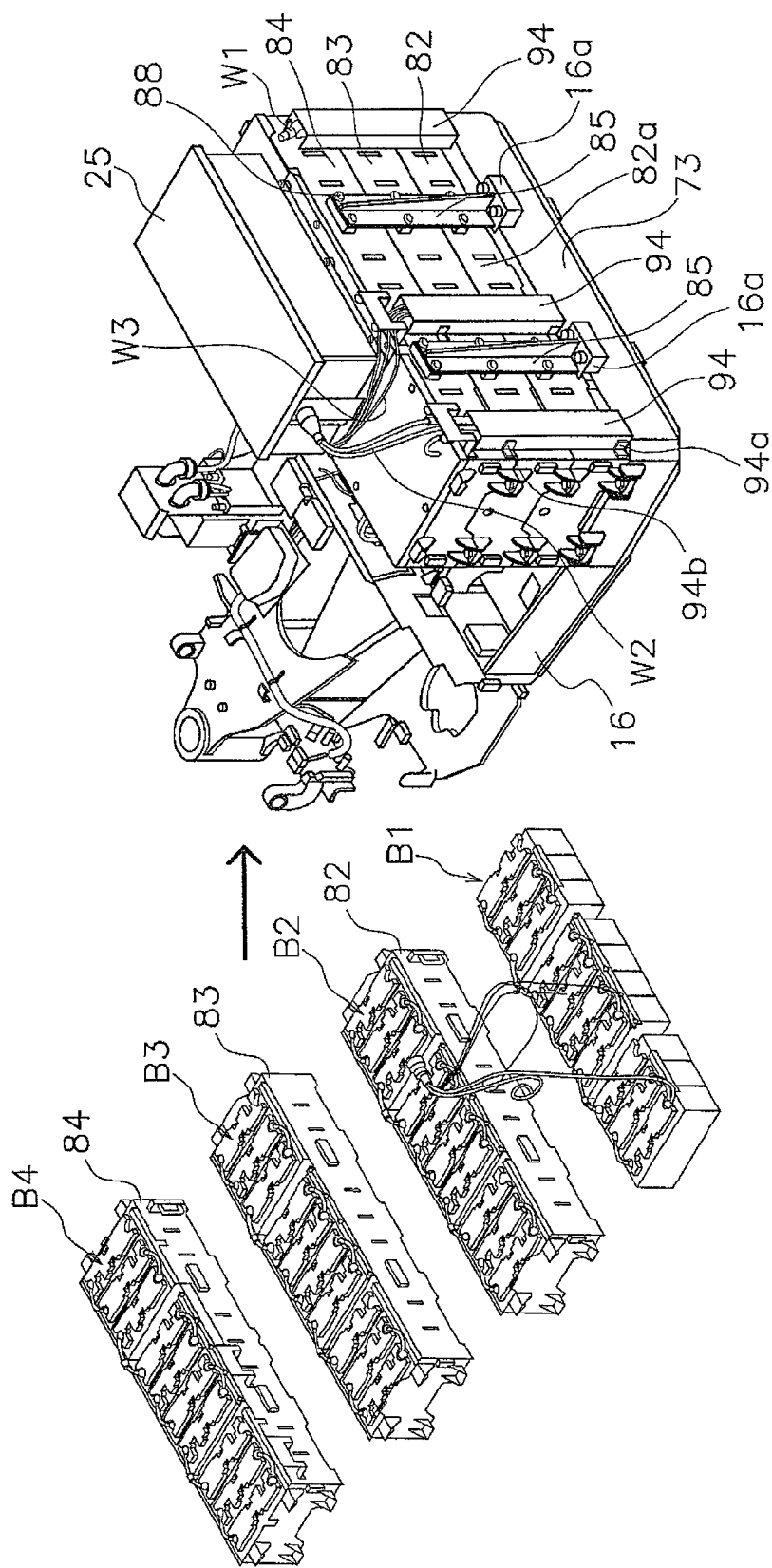
FIG. 5 is an external perspective view of battery groups and a battery holding structure.

The plural batteries 24 forming the power source unit 19 are disposed in the battery accommodation region E produced in the rear end portion of the revolving frame 16. As illustrated in FIG. 2, the plural batteries 24 are disposed in alignment with each other in the right-and-left direction while being stacked in the vertical direction. In the present exemplary embodiment, the plural batteries 24 are stacked in four layers. In the following explanation, plural batteries in the lowest layer illustrated in FIGS. 4 and 5 are referred to as a first battery group B1, while plural batteries in the second layer, those in the third layer and those in the fourth layer, which are illustrated in FIG. 5, are referred to as a second battery group B2, a third battery group B3 and a fourth battery group B4, respectively.

First, as illustrated in FIG. 4, the first battery group B1 is mounted to the battery accommodation region E enclosed by the battery accommodation compartment plate 64 on the revolving frame 16. On the other hand, as illustrated in FIG. 5, the second, third and fourth battery groups B2 to B4 are accommodated in second, third and fourth battery cases 82, 83 and 84, respectively.

Each of the battery cases 82 to 84 has a bottom wall and front, rear, right and left sidewalls, and is thus formed in a box shape upwardly opened. Further, the respective battery cases 82 to 84 are fixed to the rear end portion of the revolving frame 16 by two pillars 85 formed in the same shape.

Figure 6:
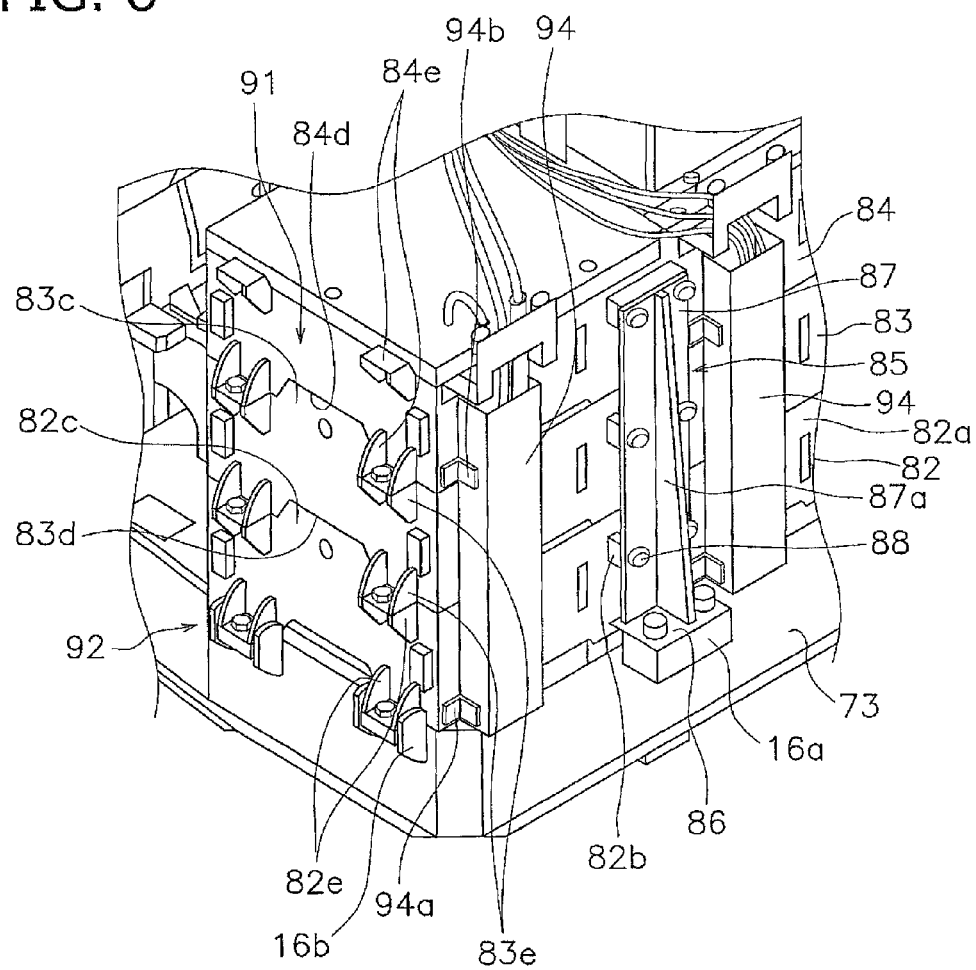
FIG. 6 is a partial enlarged view of FIG. 5.

FIG. 6 illustrates an enlarged view of fixation parts between the pillars 85 and the respective battery cases 82 to 84. As illustrated in FIG. 6, the rear end portion of the revolving frame 16 is provided with two mount parts 16a protruded rearwards. The mount parts 16a are formed on the rear surface of the rear plate 73 of the battery accommodation compartment plate 64, while being positioned correspondingly to the left and right vertical partition plates 68a and 68b. Each pillar 85 has: a frame fixation portion 86 formed on the bottom end thereof, and a case fixation portion 87 upwardly extended from the frame fixation portion 86. The frame fixation portion 86 is fixed to each mount part 16a of the revolving frame 16 by means of bolts. Further, a rib 87a extended up and down is formed on the rear surface of the case fixation portion 87, and reinforces the strength of the case fixation portion 87.

Here, all the fixation parts between the respective battery cases 82 to 84 and the pillars 85 are the same. Therefore, explanation will be herein made for a relation between the second battery case 82 and the pillars 85. As illustrated in FIG. 6, a plurality of nut attachment bases 82b are fixed to a rear sidewall 82a of the second battery case 82. Further, the case fixation portion 87 of each pillar 85 has through holes formed in positions corresponding to each nut attachment base 82b of the second battery case 82. Bolts 88, penetrating through the through holes, are screwed and fixed into nut portions formed in each nut attachment base 82b of the second battery case 82.

As described above, the two pillars 85 are fixed to the rear end portion of the revolving frame 16, and the second to fourth battery cases 82 to 84 are fixed to the two pillars 85. Thus, the second to fourth battery cases 82 to 84 are fixed to the revolving frame 16.

Further, the respective battery cases 82 to 84 are provided with a positioning structure 81 and a lateral support structure 92 on the right and left sidewalls thereof. The positioning structure 91 is a structure for restricting the battery cases 82 to 84 from being misaligned relatively to each other in the back-and-forth direction. On the other hand, the lateral support structure 92 is a structure for fixing the right and left sidewalls of the battery cases 82 to 84 to the revolving frame 16.

The positioning structure 91 is formed by convex and concave portions formed on the sidewalls of the respective battery cases 82 to 84. Specifically, first, convex portions 82c and 83c, having a trapezoid shape in a side view, are formed in the center parts in the back-and-forth direction on the top surfaces of the sidewalls of the second and third battery cases 82 and 83. Further, concave portions 83d and 84d, into which the convex portions 82c and 83c of the second and third battery cases 82 and 83 are fitted, are formed on the lower surfaces of the sidewalls of the third and fourth battery cases 83 and 84. The second to fourth battery cases 82 to 84 are positioned by the convex and concave portions fitted to each other, while being restricted from moving in the back-and-forth direction.

The lateral support structure 92 is formed by coupling brackets formed on the sidewalls of the respective battery cases 82 to 84. Specifically, each of the battery cases 82 to 84 has four coupling brackets 82e to 84e formed on the both top and bottom end portions of the both front and rear ends of each sidewall thereof. Further, the coupling brackets 82e, formed on the bottom end portions of the second battery case 82, are fixed to coupling brackets 16b formed on the revolving frame 16 by means of bolts. Further, the coupling brackets 82e, formed on the top end portions of the second battery case 82, are coupled to the coupling brackets 83e formed on the bottom end portions of the third battery case by means of bolts. Furthermore, the coupling brackets 83e, formed on the top end portions of the third battery case 83, are coupled to the coupling brackets 84e formed on the bottom end portions of the fourth battery case 84 by means of bolts.

Thus, all the sidewalls of the battery cases 82 to 84 are designed to be fixed to the revolving frame 16 by coupling the respective battery cases 82 to 84 to each other by means of the coupling brackets 82e to 84e, and simultaneously, by fixing the coupling brackets 82e of the second battery case to the revolving frame 16.

Cable Protection

The plural batteries 24 are connected at the terminals thereof by means of electric cables (hereinafter simply referred to as cables). Further, as illustrated in FIG. 5, the vertically adjacent rightmost batteries, included in the respective stacked battery groups B1 to B4, are connected to each other at the terminals thereof by means of cables W1, whereas the leftmost batteries, included in the respective stacked battery groups B1 to B4 of the respective battery cases 82 to 84, are separately connected to the contactor box 25 by means of cables W2. Further, the batteries, located roughly in the center parts of the battery groups B1 to B4 in the right-and-left direction in the respective layers, are separately connected at the terminals thereof to the contactor box 25 by means of cables W3. Further, the respective cables W1, W2 and W3 are backwardly pulled out of the respective battery cases 82 to 84 through openings bored through the rear sidewalls of the respective battery cases 82 to 84.

As described above, the plural cables are designed to be outwardly exposed to the rear of the battery cases 82 to 84 from the center part and the both rightmost and leftmost parts of the battery groups B1 to B4 in the respective layers. In view of this, in the present exemplary embodiment, three guard members 94 are provided for protecting the cables.

All the three guard members 94 have the same shape. Each guard member 94 is an upwardly and downwardly opened member with a squared C-shaped cross-section and has a rear wall and right and left sidewalls. Further, the cables are accommodated inside the guard members 94. Each guard member 94 has laterally protruded fixation portions 94a and 94b on the lower and upper portions of the right and left sidewalls. Further, the lower-side fixation portions 94a are fixed to the rear sidewall of the second battery case 82 by means of bolts, whereas the upper-side fixation portions 94b are fixed to the rear sidewall of the fourth battery case 84 by means of bolts.

It should be noted that the respective battery cases 82 to 83 are not provided with any devices and mechanisms on the front sidewalls thereof for fixing the respective battery cases 82 to 84 to the revolving frame 16 or for fixing the battery cases to each other. Therefore, the battery cases 82 to 84 can be disposed adjacently to the heat shield plate 28, and accordingly, the power source unit 19 can be entirely disposed forwards. In other words, the rear part of the revolving frame 16 can be inhibited from being protruded rearwards.

Gas Discharge Structure of Battery

The plural batteries 24 of a sealed type, forming a part of the power source unit 19, are lead shield batteries. The batteries 24 are configured to cause large electric current to flow therethrough in charging and activation, and are configured to produce gas when the temperature is increased. A processing of returning the produced gas to battery liquid is performed within the batteries. However, in some cases, the gas cannot be completely processed inside the batteries. In view of this, a gas discharge structure is provided for discharging the inside gas to the outside of the batteries when the pressure of the inside of the batteries reaches a predetermined pressure or greater. Further, the battery liquid is configured to be released when the temperature is further increased. The structure is configured to be actuated also in an emergency.

Figure 7:
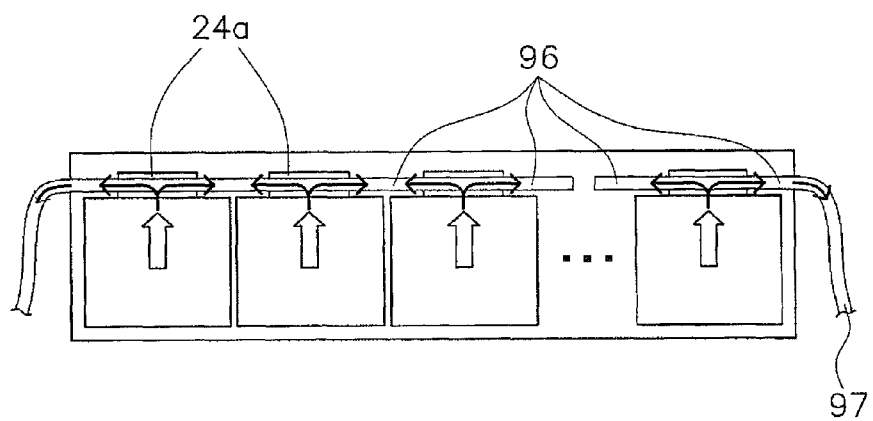
FIG. 7 is a schematic view of a gas discharge structure.
Figure 8:
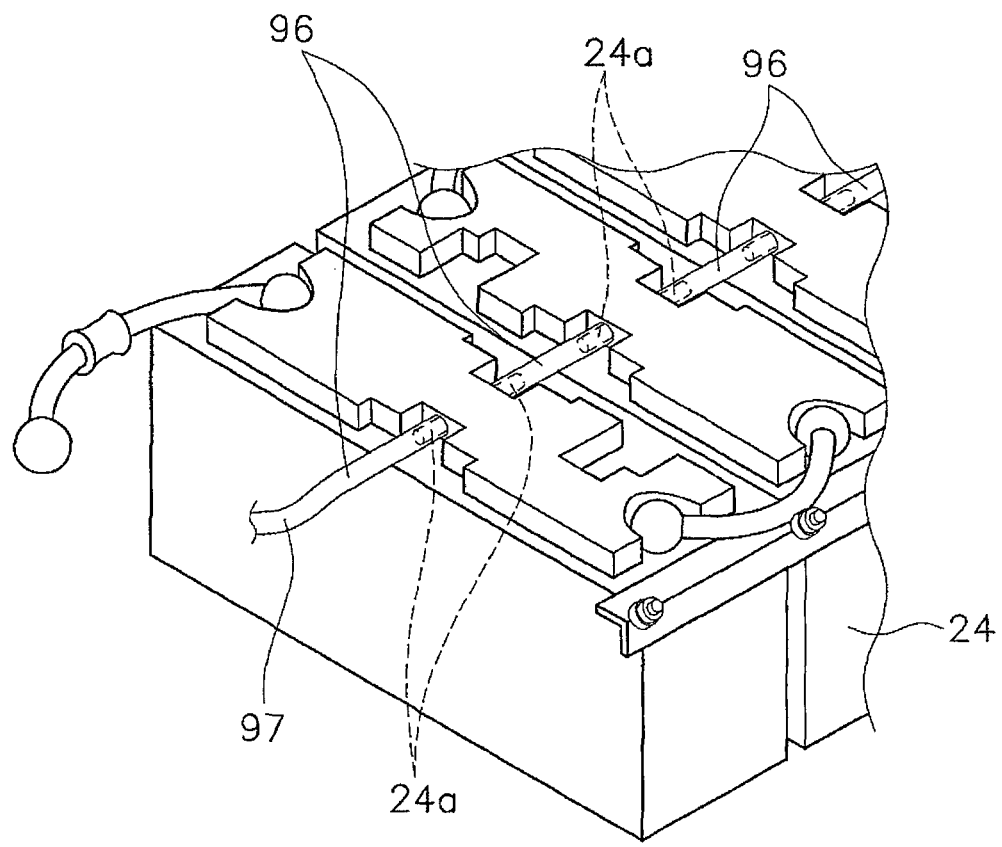
FIG. 8 is an external perspective view of a part of the gas discharge mechanism.
Figure 9:
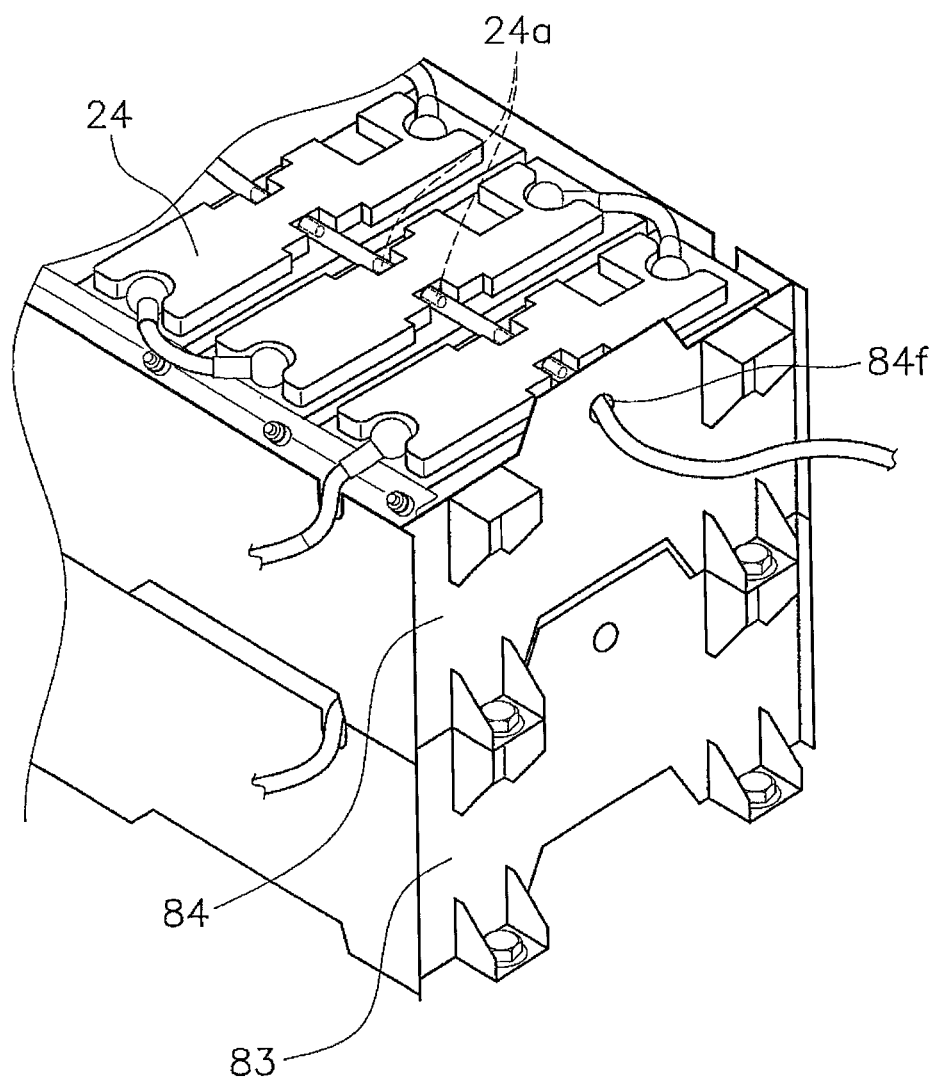
FIG. 9 is an external perspective view of a part of the gas discharge mechanism.

FIG. 7 represents a schematic diagram of the gas discharge structure. Further, FIG. 8 illustrates a part of the gas discharge structure. As illustrated in these figures, a pair of discharge ports 24a and 24a are formed on the top surface of each battery 24, while being protruded in the both directions that the batteries 24 are aligned, i.e., leftwards and rightwards. The gas, which was generated inside the batteries and could not be completely processed, is discharged from the pair of discharge ports 24a and 24a through an inner pressure control valve (not illustrated in the figures) embedded inside each battery. Further, the discharge ports 24a of adjacent batteries are connected through communication hoses 96. Furthermore, drain hoses 97 are connected to the outer discharge ports 24a of the batteries disposed on the both ends of the battery groups B1 to B4 in the respective layers. One ends of the respective drain hoses 97 are connected to the discharge ports 24a of the relevant batteries 24, whereas the other ends of the respective drain hoses 97 are pulled to the outside of the vehicle body through hose openings 84f bored through the right and left sidewalls of the respective battery cases 82 to 84 as illustrated in FIG. 9. Further, the gas, discharged thereto through the respective communication hoses 96, is discharged to the outside through the respective drain hoses 97.

Action

The inverter device 20 converts DC power from the batteries 24 of the power source unit 19 into AC power with an arbitrary frequency. The electric motor 18 is driven by means of AC power to be supplied thereto from the inverter device 20, and in turn, drives the hydraulic pump 21. Further, the hydraulic pressure from the hydraulic pump 21 is supplied through the control valve 22 to the respective hydraulic cylinders 43 to 45, the revolving and travelling motors 55.

A vehicle driving operation and a working operation are similar to those of a hydraulic excavator equipped with a well-known engine. In other words, when an operator operates the respective operating levers, the hydraulic pressure to be supplied from the hydraulic pump 21 is controlled in the control valve 22 in response to the operation. Accordingly, the travelling mechanisms 11 are driven at an appropriate speed in response to the operation, and a work is performed in response to the operation.

Incidentally, in charging the batteries 24, the quick charger 61 is connected to the charge connector 60. DC power, supplied from the quick charger 61, is applied to the batteries 24 through the contactor box 25. The batteries 24 are thereby charged. While being charged, the batteries 24 produce gas. The produced gas is processed inside, but in some cases, cannot be completely processed depending on a charged state. In such case, the inner pressure control valves embedded inside the batteries are actuated, and thereby, the gas is discharged to the outside of the batteries. The gas or the battery liquid, discharged from the respective batteries 24, is directed to the both ends of the respective battery groups B1 to B4 through the communication hoses 96 and is discharged to the outside of the vehicle body through the drain hoses 97 on the both sides.

Features (1) The plural battery cases 82 to 84 are fixed to the two pillars 85 fixed to the rear end portion of the revolving frame 16. Further, the battery cases 82 to 84 are positioned while being restricted from moving relatively to each other in the back-and-forth direction by the positioning structure 91. Yet further, the sidewalls of the battery cases 82 to 84 are fixed to the revolving frame 16 by the lateral support structure 92. Accordingly, members for fixation such as pillars are not required to be mounted to the front parts of the battery cases 82 to 84. Therefore, the power source unit 19 including the battery cases 82 to 84 is enabled to be disposed further forwards in the vehicle in comparison with a well-known art. Consequently, the revolving frame 16 can be inhibited from being bulged rearwards, and the rear revolving radius of the electric excavator can be reduced.

(2) The positioning structure 91 of the battery cases 82 to 84 is formed by the convex and concave portions formed on the sidewalls of the respective battery cases 82 to 84. Therefore, the plural battery cases can be positioned in the back-and-forth direction with the simple structure.

Other Exemplary Embodiments

The present invention is not limited to the exemplary embodiment as described above, and a variety of changes or modifications can be made without departing from the scope of the present invention.

(a) As the lateral support structure, such a fixation frame may be provided that the bottom end thereof is fixed to the revolving frame 16 while the top end thereof is extended to the fourth battery case. Further, the respective battery cases may be fixed to the fixation frame.

(b) The number and the shape of the pillars fixed to the rear end portion of the revolving frame 16 are not limited to those of the aforementioned exemplary embodiment.

According to the illustrated embodiments, even when batteries are disposed in the rear end portion of a frame, the batteries and the frame can be inhibited from being bulged rearwards, and thus, increase in size of a vehicle can be avoided.

The invention claimed is:

1. A battery holding structure for an electric work vehicle equipped with a battery-driven electric motor, the battery holding structure comprising:
    a base frame including a base plate, a plurality of vertical partition plates, and a plurality of mount parts, the vertical partition plates being arranged erectly on the base plate to extend in a longitudinal direction, the vertical partition plates being spaced laterally inward from side portions of the base plate, the mount parts being disposed on a rear end portion of the base frame in positions corresponding to the vertical partition plates such that at least a portion of the base frame extends laterally to the outside beyond each of two laterally outermost mount parts among the plurality of the mount parts;
    a plurality of battery cases respectively having a bottom wall and front, rear, right and left sidewalls, each of the battery cases respectively accommodating a plurality of batteries aligned in a lateral direction, the plurality of battery cases being arranged on the rear end portion of the base frame and stacked in a vertical direction with the lateral widths of the battery cases being aligned with a lateral width of the base frame;
    a plurality of pillars to which the rear sidewalls of respective ones of the stacked battery cases are fixed, the plurality of pillars being respectively fixed at bottom end portions thereof to the mount parts of the base frame and extending upwardly.

2. The battery holding structure for an electric work vehicle recited in claim 1, further comprising
    a positioning structure provided in the right and left sidewalls of the plurality of battery cases, the positioning structure restricting every adjacent two of the battery cases in a stacked direction from moving relatively to each other in a back-and-forth direction.

3. The battery holding structure for an electric work vehicle recited in claim 1, further comprising
    a lateral support structure supporting the right and left sidewalls of the plurality of battery cases with respect to the base frame.

4. The battery holding structure for an electric work vehicle recited in claim 1, wherein
    the base plate is arranged and configured to extend in a longitudinal direction of the electric work vehicle.

5. An electric work vehicle comprising:
    a vehicle body frame;
    a travelling mechanism supported by the vehicle body frame;
    a working machine unit including a working machine and a working machine drive part configured and arranged to drive the working machine;
    an electric motor configured and arranged to drive the travelling mechanism and the working machine unit;
    the battery holding structure recited in claim 1; and a power source unit including the plurality of batteries, the power source unit configured and arranged to supply electric power to the electric motor.

6. A battery holding structure for an electric work vehicle equipped with a battery-driven electric motor, the battery holding structure comprising:
a plurality of battery cases respectively having a bottom wall and front, rear, right and left sidewalls, the plurality of battery cases respectively accommodating a plurality of batteries aligned in a lateral direction, the plurality of battery cases being stacked in a vertical direction;
a base frame with the plurality of battery cases being installed in a rear part thereof, the base frame including a plurality of vertical partition plates arranged to extend in a longitudinal direction and a plurality of mount parts disposed on a rear portion of the base frame in positions corresponding to the vertical partition plates;
a plurality of pillars to which the rear sidewalls of respective ones of the respective battery cases are fixed, the plurality of pillars being respectively fixed at bottom end portions thereof to the mount parts of the base frame and extending upwardly;
a positioning structure provided in the right and left sidewalls of the plurality of battery cases, the positioning structure restricting every adjacent two of the battery cases in a stacked direction from moving relatively to each other in a back-and-forth direction, the positioning structure being formed by convex and concave portions provided in the right and left sidewalls of respective ones of the plurality of battery cases, the convex and concave portions restricting the every adjacent two of the battery cases in an up-and-down direction from moving relatively to each other in the back-and-forth direction by causing the every adjacent two of the battery cases in the up-and-down direction to be fitted to each other.

7. An electric work vehicle comprising:
a vehicle body frame;
a travelling mechanism supported by the vehicle body frame;
a working machine unit including a working machine and a working machine drive part configured and arranged to drive the working machine;
an electric motor configured and arranged to drive the travelling mechanism and the working machine unit;
a power source unit including a plurality of batteries, the power source unit configured and arranged to supply electric power to the electric motor; and
a battery holding structure accommodating the plurality of batteries, the battery holding structure having:
a plurality of battery cases respectively having a bottom wall and front, rear, right and left sidewalls, the plurality of battery cases respectively accommodating at least a portion of the plurality of batteries with the batteries aligned in a lateral direction, the plurality of battery cases being stacked in a vertical direction,
a base frame with the plurality of battery cases being installed in a rear part thereof, the base frame including a plurality of vertical partition plates arranged to extend in a longitudinal direction and a plurality of mount parts disposed on a rear portion of the base frame in positions corresponding to the vertical partition plates, the base frame being revolvable about a revolving shaft extending in an up-and-down direction, and
a plurality of pillars to which the rear sidewalls of respective ones of the respective battery cases are fixed, the plurality of pillars being respectively fixed at bottom end portions thereof to the mount parts of the base frame and extending upwardly,
the electric motor being disposed between the revolving shaft and the battery holding structure disposed in the rear part of the base frame.

8. A battery holding structure for an electric work vehicle equipped with a battery-driven electric motor, the battery holding structure comprising:
a base frame including
a base plate arranged and configured to extend in a longitudinal direction of the electric work vehicle,
a plurality of vertical partition plates arranged erectly on the base plate and extending in the longitudinal direction,
a plurality of-mount parts disposed on a rear portion of the base frame in positions corresponding to the vertical partition plates, and
a battery accommodation compartment plate disposed on rearward portion of the base frame, the battery accommodation compartment plate forming a battery accommodation region accommodating a first plurality of batteries, each of the vertical partition plates being arranged and configured to extend into the battery accommodation region and be laterally sandwiched between a pair of batteries among the first plurality batteries accommodated in the battery accommodation region;
a plurality of battery cases each having a bottom wall and front, rear, right and left sidewalls, the plurality of battery cases being stacked in a vertical direction and arranged on a rear part of the base frame above the first plurality of batteries, the plurality of battery cases accommodating a second plurality of batteries aligned in a lateral direction; and
a plurality of pillars to which the rear sidewalls of respective ones of the respective battery cases are fixed, the plurality of pillars being respectively fixed at bottom end portions thereof to the mount parts of the base frame and extending upwardly.

9. A battery holding structure for an electric work vehicle equipped with a battery-driven electric motor, the battery holding structure comprising:
a base frame including a base plate, a plurality of vertical partition plates, and a plurality of mount parts, the vertical partition plates being arranged erectly on the base plate and extending in a longitudinal direction of the electric work vehicle, the mount parts being disposed rearward of the vertical partition plates on a rear end portion of the base frame in positions corresponding to the vertical partition plates;
a plurality of battery cases stacked in a vertical direction on a rearward portion of the base frame, each of the battery cases respectively having a bottom wall and front, rear, right and left sidewalls, each of the battery cases respectively accommodating a plurality of batteries aligned in a lateral direction; and
a plurality of pillars to which the rear sidewalls of respective ones of the stacked battery cases are fixed, bottom end portions of the plurality of pillars being respectively fixed to the mount parts of the base frame and extending upwardly,
the vertical partition plates extending continuously forward from the rear end portion of the base frame to a position beyond the front side walls of the battery cases.

* * * * *